United States Patent [19]

Matsumoto et al.

[11] Patent Number: 4,948,066
[45] Date of Patent: Aug. 14, 1990

[54] RETRACTOR FOR SEAT BELTS

[75] Inventors: Kenjiro Matsumoto, Osaka; Kazuta Tsukahara, Ibaraki, both of Japan

[73] Assignee: Ashimori Industry Co., Ltd., Osaka, Japan

[21] Appl. No.: 249,187

[22] PCT Filed: Dec. 11, 1987

[86] PCT No.: PCT/JP87/00971
§ 371 Date: Aug. 12, 1988
§ 102(e) Date: Aug. 12, 1988

[87] PCT Pub. No.: WO88/04245
PCT Pub. Date: Jun. 16, 1988

[30] Foreign Application Priority Data

Dec. 12, 1986 [JP] Japan .................. 61-296347

[51] Int. Cl.$^5$ .................. A62B 35/00; B65H 75/48
[52] U.S. Cl. .................. 242/107.4 A; 242/107.4 R; 242/107.4 B
[58] Field of Search .................. 242/107.4 R, 107.4 A, 242/107.4 B; 297/478; 280/806

[56] References Cited

U.S. PATENT DOCUMENTS

| 4,135,682 | 1/1979 | Mizuno | 242/107.4 B |
| 4,429,841 | 2/1984 | Kassai | 242/107.4 B |
| 4,518,132 | 5/1985 | Schmidt | 242/107.4 R X |
| 4,552,319 | 11/1985 | Gavagan | 242/107.4 A |
| 4,583,701 | 4/1986 | Matsui et al. | 242/107.4 R X |
| 4,691,875 | 9/1987 | Higbee | 242/107.4 B |
| 4,726,539 | 2/1988 | Schmidt et al. | 242/107.4 A |

FOREIGN PATENT DOCUMENTS

| 2817214 | 10/1979 | Fed. Rep. of Germany ... 242/107.4 B |
| 2131279 | 6/1984 | Fed. Rep. of Germany ... 242/107.4 B |
| 58-204643 | 11/1983 | Japan . |
| 60-99743 | 6/1985 | Japan . |
| 60-294727 | 12/1985 | Japan . |
| 60-294728 | 12/1985 | Japan . |
| 62-155156 | 7/1987 | Japan . |
| 62-155157 | 7/1987 | Japan . |

Primary Examiner—Katherine A. Matecki

[57] ABSTRACT

A retractor for seat belts is provided which can fulfil the functions of both the automatic locking retractors (ALR) and the emergency locking retractors (ELR), having a spindle supporting a webbing take-up shaft and given a turning force in the direction of winding of the webbing, and a locking device including a clutch member. The said clutch member includes an inertia member adapted to be actuated by either vehicle body acceleration or webbing acceleration and arranged to restrain the rotation of the spindle in the direction of unwinding of the webbing, including a synchrogear synchronously rotatable with the spindle, a lever mounted on the clutch member of the locking device so as to turn freely and engageable with the synchrogear, a spring member for biasing the lever in the direction of its engagement with the synchrogear, a control cam adapted to allow the lever to engage with the synchrogear when the webbing is pulled out nearly in full length and allow the lever to disengage from the synchrogear when the webbing is rewound by some degree. A speed reducing transmission is provided to transmit rotation of the spindle to the control cam. When the webbing has been pulled out nearly in full length it can be changed from the ELR state over to the ALR state, and when the webbing has been rewound nearly in full length it can be changed from the ALR state over the ELR state.

2 Claims, 11 Drawing Sheets

RETRACTOR FOR SEAT BELTS

BACKGROUND OF THE INVENTION

1. Field of the Invention

This invention relates to a retractor for winding the webbing of seat belts which is provided in a vehicle to restrain a seat belt wearer in case of emergency, and more particularly to improvements in emergency locking retractors adapted to restrain or lock the pulling-out or unwinding of the webbing by an acceleration or deceleration applied suddenly to the vehicle body.

2. Description of Related Art

In recent years, it has become compulsory for vehicle drivers and fellow-passengers to wear seat belts in many countries in order to prevent them from being killed, getting hurt or being physiologically injured in traffic accidents. In general, a seat belt comprises a webbing for restraining a seat belt wearer, a buckle for wearing this webbing, and a retractor for controlling the unwinding and rewinding of the webbing. A variety of devices are provided on the retractors for controlling the unwinding and rewinding of the webbing. As for such retractors for seat belts, there are Automatic Locking Retractors (ALR) wherein when the unwound webbing is once rewound operationally it cannot be pulled out any longer, and Emergency Locking Retractors (ELR) wherein an arrangement is made such that the acceleration applied to the vehicle body is detected, and when the detected acceleration exceeds a predetermined value, it becomes impossible to pull out the webbing. In case a seat belt is used to fix a child safety seat securely onto a seat in a vehicle, the Automatic Locking Retractors are arranged such that when the webbing is once rewound it becomes impossible to pull out and it is superior, in the restraint point of view, to the Emergency Locking Retractors adapted to restrain the pulling-out or unwinding of the webbing only in the case of an emergency. However, the Automatic Locking Retractors pose a problem in that, because they restrain seat belt wearers all the time, the wearers cannot move their bodies freely thus causing the wearers to feel uncomfortable.

In view of such situations, there has been developed in recent years a retractor for seat belts which can fulfill the function of both the ALR and the ELR and can be used selectively as either the ALR or ELR in such a manner that when the webbing is pulled out in full length from the retractor it may function as the ALR type seat belt, while in other conditions it may function as the ELR type seat belt. (For example, reference is to be made to U.S. Pat. No. 4,436,255.) U.S. Pat. No. 4,436,255 specification discloses a retractor for seat belts which comprises, in combination, a retractor which is comprised fundamentally of a ratchet wheel fixed to a webbing take-up shaft and a pawl engageable with the ratchet wheel so as to stop the unwinding rotation of the webbing from the take-up shaft; an inertia lock mechanism; and cam means which is comprised of a cam member and a follower member, the arrangement being made such that when the webbing is pulled out in full length to restrain the wearer the pawl is engageable with the ratchet wheel, and when the webbing is unwound by a predetermined amount from the take-up shaft, the take-up shaft is rotatable in either direction, but when the inertia lock mechanism is actuated in a vehicular emergency situation the rotation of the take-up shaft is stopped.

However, this automatic-emergency locking retractor for seat belts has been disadvantageous in that it is arranged to be changed over to ALR type seat belt by rewinding the webbing to some degree after it has been pulled out nearly in full length. In other words it cannot be changed over to ALR unless the webbing is pulled out once nearly in full length and then rewound by some amount. Further, the inventor of the present invention developed previously a retractor for seat belts which can fulfil both functions of ALR and ELR and can be used selectively as either ALR or ELR in such a manner that when the webbing is pulled out nearly in full length from the retractor and when the webbing has once been locked it may function as ALR, while in other conditions it may function as ELR. (Japanese Utility Model Registration Application No. SHO 61-60945) However, such a retractor for seat belts which can fulfil functions of both ALR and ELR is arranged such that when the webbing has once been locked it may function as ALR, and therefore the seat belt wearer is restrained by the webbing so that he cannot change his posture freely and so he feels strong tightness. Further, the above-mentioned retractor has been disadvantageous in that, in order to pull out the webbing after it has once been locked, it is necessary to release or unlock the thus locked webbing thus necessitating the rewinding of it once in full length.

OBJECTS AND SUMMARY OF THE INVENTION

The present invention has for its object to provide a retractor for seat belts which can overcome the above-mentioned problems inherent in the prior art retractors for seat belts and which is arranged such that when the webbing is not pulled out fully it may function as an ELR, and in a normal wearing condition the seat belt wearer does not feel a strong tightness, and also in the case of an emergency it can restrain the seat belt wearer securely.

According to the present invention, the above-mentioned object can be achieved by improving the retractor for seat belts wherein the locking means comprises a clutch member adapted to rotate the spindle in the direction of unwinding of the webbing an inertia means and actuate a restraining means for directly restraining the rotation of the spindle.

The characteristic features of the retractor according to the present invention can be summarized as follows.

According to the present invention, there is provided a retractor for seat belts, having a spindle supporting a webbing take-up shaft thereon and adapted to be given a turning force in the direction of winding of the webbing, and a locking means including an inertia means actuated by at least either the acceleration applied suddenly to the vehicle body or the quick pulling-out of the webbing and a clutch member, capable of restraining the rotation of the spindle in the direction of unwinding of the webbing by the inertia means actuated in case of emergency, characterized in that it comprises a synchrogear arranged to be rotated synchronously with said spindle; a lever mounted on the clutch member of said locking means so as to turn freely and be engageable with the synchrogear; a spring member for biasing this lever in the direction of its engagement with said synchrogear; a control cam adapted to allow said lever to engage with the synchrogear when the webbing is pulled out nearly in full length and allow said lever to disengage from the synchrogear when the webbing is rewound by some degree; and a transmission means adapted to reduce the rotational speed of said spindle and transmit the reduced rotational speed to the control cam, the arrangement being made such that when the webbing is pulled out nearly in full length it can be changed from an ELR state over to an ALR state, and when the webbing is rewound or taken up nearly in full length it can be changed from the ALR state over to the ELR state.

Stating briefly, according to the present invention, there is provided a retractor for seat belts having an excellent operability wherein it is not allowed to be changed over to the ALR when a seat occupant wears the seat belt, but it is allowed to be changed over to the ALR only by pulling out the webbing by a predetermined amount which is nearly equal to the full length thereof.

The present invention will now be described below by way of example only with reference to the accompanying drawings.

BRIEF DESCRIPTION OF THE DRAWINGS

FIG. 1 is a front view showing the longitudinal section of the retractor;

FIGS. 2, 3, 4 and 5 are partially broken right side views, respectively, of the retractor of FIG. 1 to show the operation thereto; and FIG. 6 is a front view showing in detail the inertia mass illustrated in FIG. 1.

DETAILED DESCRIPTION OF PREFERRED EMBODIMENTS

Figure 1:
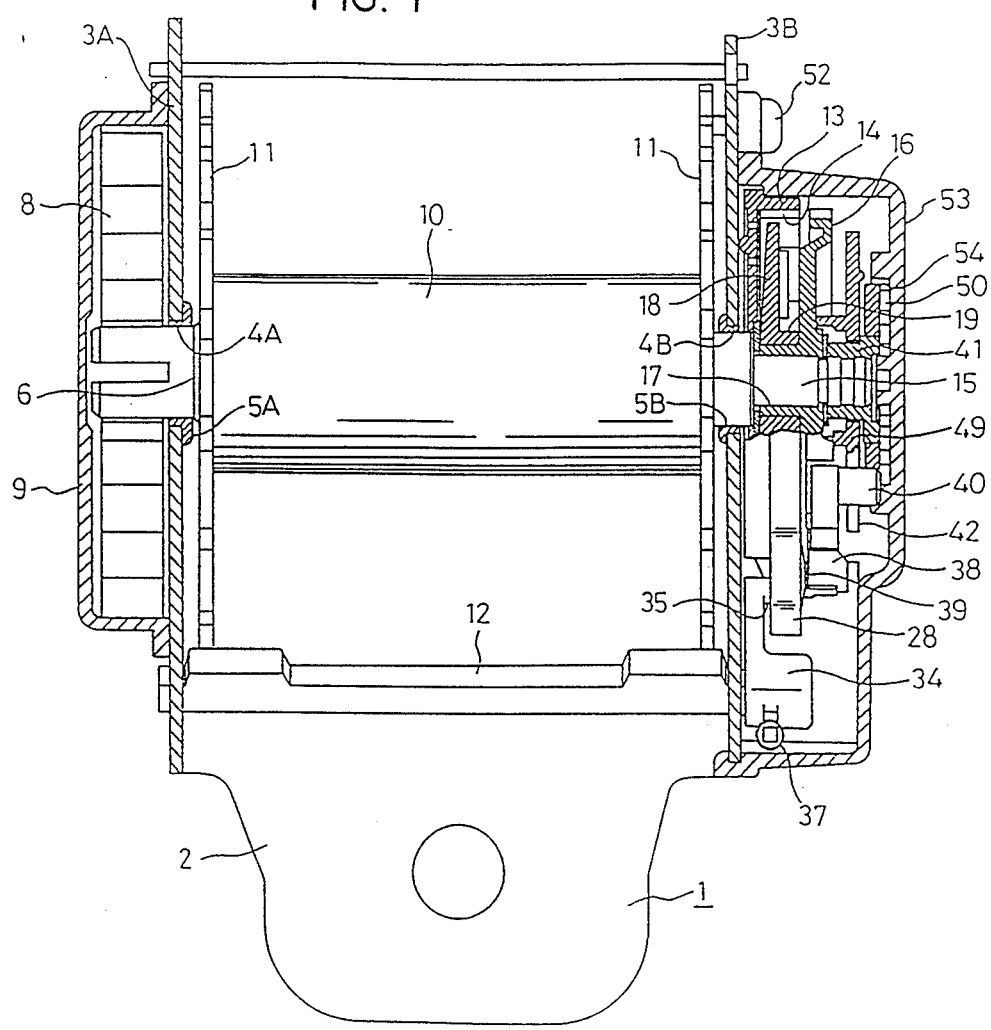
FIGS. 1 to 6 shows a first embodiment of the retractor for seat belts according to the present invention.

A retractor body 1 arranged to be attached to the vehicle body is of an approximately U-shaped configuration formed by a base plate 2 fixedly secured to the vehicle body, and a pair of upstanding side plates 3A and 3B are formed integrally on both side edges of the retractor body 1 in opposed and parallel relationship with each other. Both the side plates 3A and 3B have bearing receiving holes 4A and 4B, respectively, which are perforated coaxially in the central parts thereof. Bearings 5A and 5B are fixedly mounted, respectively, in the bearing receiving holes 4A, 4B. A spindle 6 for winding a webbing thereon is rotatably mounted on the bearings 5A and 5B. One end of the spindle 6 is supported in the bearing 5A, while the other end thereof is supported in the bearing 5B.

One end of the spindle 6 extends through the side plate 3A. Attached to one end of the spindle 6 is the inner end of a spiral spring 8, the outer end of which is attached to a cover 9 for covering the outside of the side plate 3A. The spindle 6 is given a turning force by this spiral spring 8 in the direction of winding of the webbing.

The portion of the spindle 6 between the side plates 3A and 3B has a take-up shaft 10 fitted thereon for winding the webbing thereon. Both ends of the spindle 6 have ratchet wheels 11,11, respectively, fitted thereon. Both of the side plates 3A and 3B have a plate-shaped pawl member 12 mounted thereon which can be turned to engage with the ratchet wheels 11, 11. The arrangement is made such that the engagement of this pawl member 12 restricts the rotation of the spindle 6 and the take-up shaft 10 in the direction of unwinding of the webbing. Accordingly, this pawl member 12 and ratchet wheels 11, 11 constitutes a restraining means in the locking means.

An arcuate clutch plate 13 having a plurality of internal teeth 14, 14 formed on the inner periphery thereof is pivotally mounted on the end portion of the spindle 6 extending outwardly from the side plate 3B so that it may be rotated freely relative to the spindle 6. The end portion of the spindle 6 extending outwardly from the side plate 3B is a small diameter portion 15. A synchrogear 16 which will be mentioned below is pivotally mounted on this small diameter portion 15 so that it may be rotated together with the spindle 6. Further, a boss 19 of an inertia mass 18, which constitutes an inertia means adapted to be actuated by quickly pulling-out the webbing, is fitted on the boss 17 of the synchrogear 16 so that the boss 19 may be rotated freely.

Figure 6:
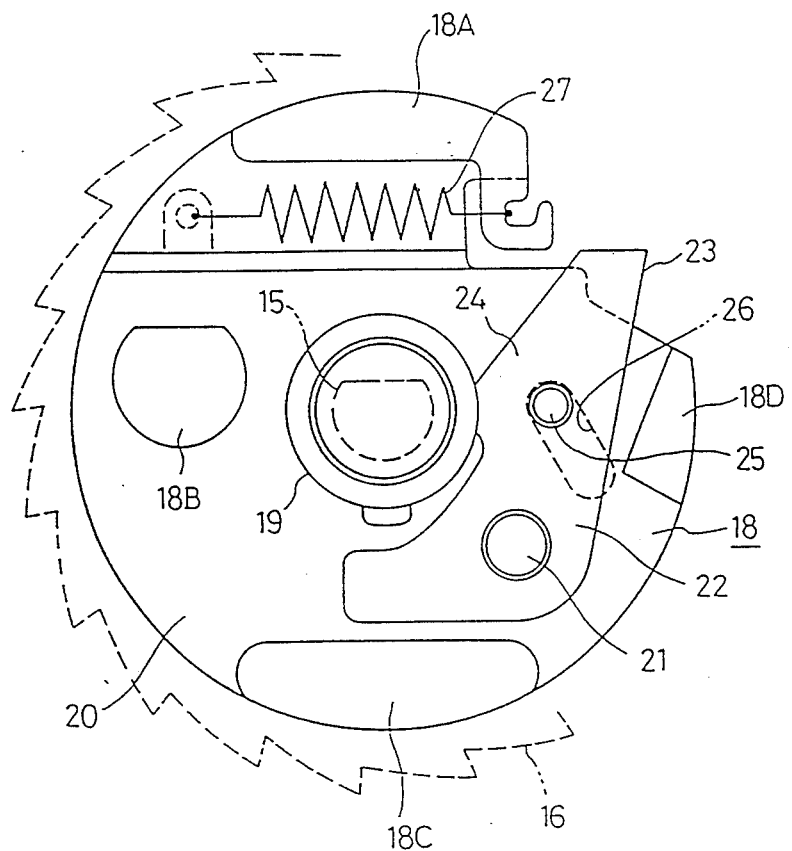

As shown in detail in FIG. 6, the inertia mass 18 is a disk-shaped metallic member which comprises a plurality of balance weights 18A, 18B, 18C and 18D located on the outer periphery of the metallic member. This inertia mass 18 has a projection 21 which projects from its side surface 20 on the side of the synchrogear 16. A locking arm 22 is pivotally mounted on the projection 21 so that its base end may be turned freely. This locking arm 22 has a pawl portion 23 formed at the leading end thereof and which is adapted to engage with the internal tooth 14 of the clutch plate 13 when the locking arm 22 is turned clockwise in FIG. 2 so as to project outwardly from the outer peripheral edge of the inertia mass 18. Further, the counterclockwise turning of this locking arm 22 is restricted to a predetermined angular range by the abutment of the intermediate portion of the locking arm 22 against the boss 19 of the inertia mass 18.

The locking arm 22 has a projection 25 which projects from its side surface 24 on the leading end thereof towards the synchrogear 16. This projection 25 is fitted in an inclined, elongated hole 26 formed in the synchrogear 16 to permit the locking arm 22 to turn within a predetermined angular range. Further, a coiled spring 27 is interposed between the synchrogear 16 and the inertia mass 18 so that when the synchrogear 16 is rotated by the spring 27 together with the spindle 6 in the direction of unwinding of the webbing, the inertia mass 18 may be driven in the same direction following up the rotation of the spring 27 and spindle 6.

The clutch plate 13 has an outwardly extending support plate 28 formed integrally in the lower part thereof. This support plate 28 has a hook 29 which is pivotally mounted thereon so as to turn freely and which is engageable with the synchrogear 16. Further, a casing 30 is attached to the side plate 3B in the vicinity of the hook 29. Mounted inside the casing 30 is a weight 31 which constitutes an inertia means adapted to swing or oscillate when the acceleration applied to the vehicle body exceeds a predetermined value. Further, a mechanical lever 32 having a projection 33 formed on the central part thereof and which is situated on the weight 31 is pivotally mounted on the upper part of the casing 30 so as to swing freely. The leading end of this mechanical lever 32 is located below the leading end of the hook 29. Further, this mechanical lever 32 is arranged to turn the hook 29 clockwise in FIG. 2 when the weight 31 is tilted so that the hook 29 may engage with the synchrogear 16. Further, when the weight 31 returns to its initial upstanding position, the mechanical lever 32 will also return to its initial condition thus disengaging the hook 29 from the synchrogear 16.

Located in the vicinity of the casing 30 is the pawl member 12 which can be turned freely and which is engageable with the ratchet wheel 11. This pawl member 12 is fitted with a connecting arm 34 having a projection 35 formed in the leading end thereof, the projection 35 being fitted in an opening or hole 36 formed in the support plate 28. Further, interposed between the connecting arm 34 and the above-mentioned casing 30 is a coiled spring 37 which gives the connecting arm 34 a counterclockwise turning tendency in order to disengage the pawl member 12 from the ratchet wheel 11.

The support plate 28 of the clutch plate 13 has a lever 38 pivotally mounted thereon so as to turn freely and which is engageable with the synchrogear 16. This lever 38 is actuated by a wire spring (coiled torque spring)39 interposed between the lever and the support plate 28 and has a tendency to turn clockwise in FIG. 2 so as to engage with the synchrogear 16. This lever 38 has a cam follower 40 formed thereon in the form of a projection extending in a direction from the synchrogear 16 towards the end of the spindle 6. A sleeve 41 is mounted on the end portion of the spindle 6 so that it may be rotated synchronously with the spindle 6. A disk-shaped control cam 42 is fitted on the outer periphery of the sleeve 41 so as to rotate freely. This control cam 42 is of the type of a periphery cam with which the cam follower 40 of the lever 38 is urged into contact. The control cam 42 has a first cam face 43 having a large diameter formed on the outer surface thereof over an angular extent of about 180 degrees and which is adapted to disengage the lever 38 from the synchrogear 16 against the resilient force of the wire spring 39. This first cam face 43 has a stopper 44 formed at the circumferentially clockwise end thereof and which is adapted to prevent the cam follower 40 from disengaging from the first cam face 43. Further, the first cam face 43 has a second cam face 45 formed integrally at the circumferentially counterclockwise end thereof and which is smaller in diameter than the first cam face 43 and adapted to engage the lever 38 with the synchrogear 16. This second cam face 45 is formed over an angular range as small as about 15 degrees. An inclined face 46 is formed between the first cam face 43 and the second cam face 45 to ensure smooth movement of the cam follower 40 between both the cam faces 43 and 45. Further, the second cam face 45 has a stopper 47 formed at the circumferentially counterclockwise end thereof and which is adapted to prevent the cam follower 40 from disengaging from the second cam face 45. Still further, the control cam 42 has a wide arcuate groove 48 formed concentrically with the first cam face 43 and over an angular range of about 180 degrees.

The sleeve 41 has an eccentric portion 49 formed in the outer end thereof and which is located eccentrically relative to the outer end of the spindle by the control cam 42. A planetary gear 50 is fitted on the eccentric portion 49 so that it may be rotated freely. Moreover, the eccentric portion 49 has a pusher pin 51 formed so as to project therefrom and which is fitted and movable in the arcuate groove 48 formed in the control cam 42. Further, the outer peripheries of the clutch plate 13, the synchrogear 16, the inertia mass 18, the casing 30, the weight 31, the mechanical lever 32, the connecting arm 34 and the planetary gear 50 which are all located outside the above-mentioned side plate 3B, are covered by a cover 53 fixedly secured to the above-mentioned side plate 3B by screws 52. This cover 53 has an internal gear 54 formed inside thereof and which is located concentrically with the spindle 6 so as to mesh with the eccentrically located planetary gear 50. Thus, the planetary gear 50 and the internal gear 54 constitutes a planetary gear mechanism serving as a transmission means so that the planetary gear 50 may be rotated in the opposite direction to that of rotation of the spindle 6 at a reduced speed.

The operation of the retractor according to the above-described embodiment will now be explained hereinafter.

Figure 2:
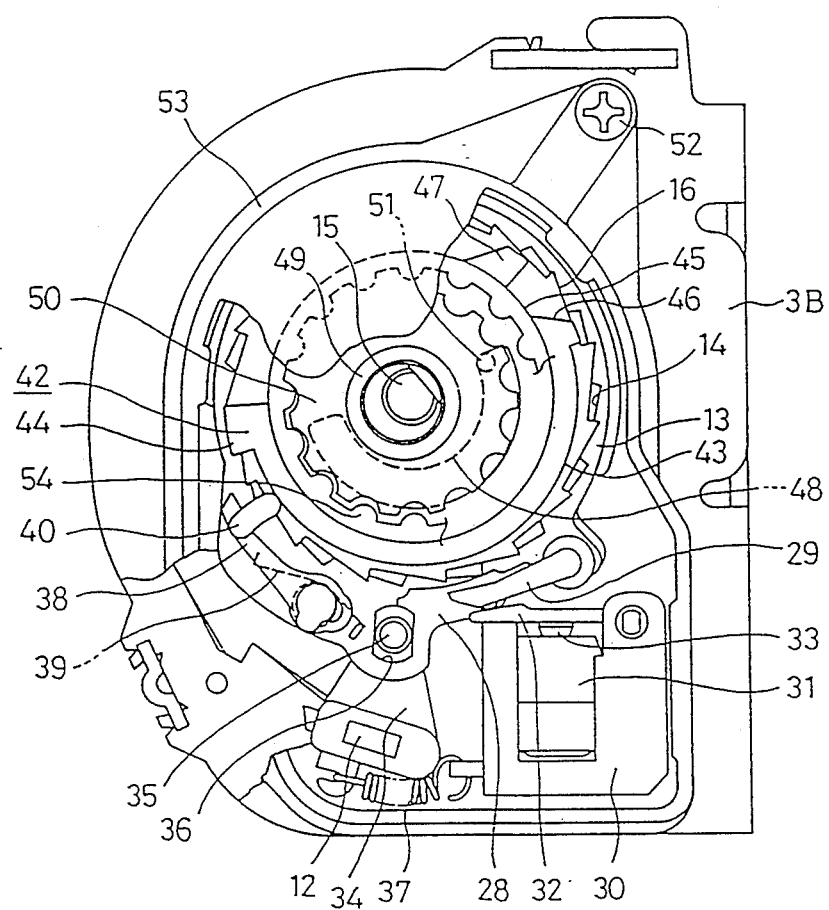

When the webbing is wound in full length, the hook 29 assumes a position where it is not allowed to engage with the synchrogear 16 as shown in FIG. 2. Further, the cam follower 40 formed integrally with the lever 38 is located at the end of the first cam 43 of the control cam 42, which is spaced away from the second cam face 45 so that the lever 38 is not allowed to engage with the synchrogear 16. Further, the pusher pin 51 projecting from the planetary gear 50 is fitted in the leading end, when viewed in the direction of unwinding of the webbing, of the arcuate groove 48 formed in the control cam 42.

When the webbing is pulled out from this condition to wind it around the seat occupant's body, the spindle 6 with the webbing wound thereon is rotated against the resilient force of the spiral spring 8 thus allowing the synchrogear 16 and the inertia mass 18 to turn following it in the counterclockwise direction as shown in FIG. 2. Further, at that time, the planetary gear 50 located eccentrically relative to the spindle 6 meshes with the internal gear 54 formed inside the fixed cover 53, the planetary gear is rotated clockwise in FIG. 2 at a reduced speed. However, since the pusher pin 51 projecting from the planetary gear 50 will move within the arcuate groove 48 formed in the control cam 42 in the clockwise direction, the control cam 42 remains stationary.

When the webbing has been pulled out to wind it around the seat occupant's body, the retractor functions as an ELR.

Stated briefly, when a braking force is applied suddenly to the vehicle while the seat occupant wears the seat belt, the weight 31 is inclined so as to turn the mechanical lever 32 clockwise in FIG. 2 to allow the hook 29 to engage with the synchrogear 16. Since the hook 29 is pivotally mounted on the clutch plate 13, the turning of the synchrogear 16 in the counterclockwise direction allows the clutch plate 13 to turn through the hook 29 in the same direction, thereby turning the connecting arm 34 clockwise to allow the pawl member 12 to engage with the ratchet wheel 11 to thereby prevent the spindle 6 from rotating in the direction of unwinding of the webbing. Therefore, there is no risk of the seat belt wearer springing forward even when braking force is applied suddenly to the vehicle. With the braking force applied suddenly to the vehicle being released thereafter, the inclined weight 31 is returned to its original upstanding condition so that the engagement of the hook 29 with the synchrogear 16 by the mechanical lever 32 is released, and also the connecting arm 34 is turned counterclockwise by the action of the coiled spring 37 to disengage the pawl member 12 from the ratchet wheel 11 thereby rendering it possible to pull out the webbing freely again.

When the seat belt wearer tends to be sprung forwardly for some reason and braking is not applied suddenly to the vehicle, the webbing will be pulled out quickly. When the webbing is quickly pulled out, the synchrogear 16 is rotated synchronously with the spindle 6, while a delay in rotation of the heavy inertia mass occurs so as to elongate the coiled spring 27 thus causing a change in the relative position between the synchrogear 16 and the inertia mass 18 in the direction of rotation, resulting in counterclockwise rotation of the synchrogear 16 preceding that of the inertia mass 18. As a result, the position of the projection 25 of the locking arm 22 which is fitted in the elongated hole 26 of the synchrogear 16 is displaced toward the outer periphery of the synchrogear 16 so that the locking arm 22 is turned clockwise as shown in FIG. 2 thus permitting the pawl portion 23 of the locking arm 22 to engage with the internal tooth 14 of the clutch plate 13 and the clutch plate 13 is turned counterclockwise together with the spindle 6 to thereby turn the connecting ar 34 clockwise to allow the pawl member 12 to engage with the ratchet wheel 11 thus preventing the spindle 6 from rotating in the direction of unwinding of the webbing. Therefore, there is no fear of the seat belt wearer springing forwardly in this case. Further, when the magnitude of the pulling-out force exerted on the webbing has reduced substantially, the webbing is rewound by the resilient force of the spiral spring 8, and at that time the relative position between the synchrogear 16 and the inertia mass 18 in the direction of rotation is returned to the original state by the action of the coiled spring 27, and the locking arm 22 is turned counterclockwise in FIG. 2 so as to disengage the clutch plate 13 from the internal tooth 14, and also the connecting arm 34 is turned counterclockwise by the action of the coiled spring 37 so as to disengage the pawl member 12 from the ratchet wheel 11 thereby making it possible again to pull out the webbing freely.

Figure 3:
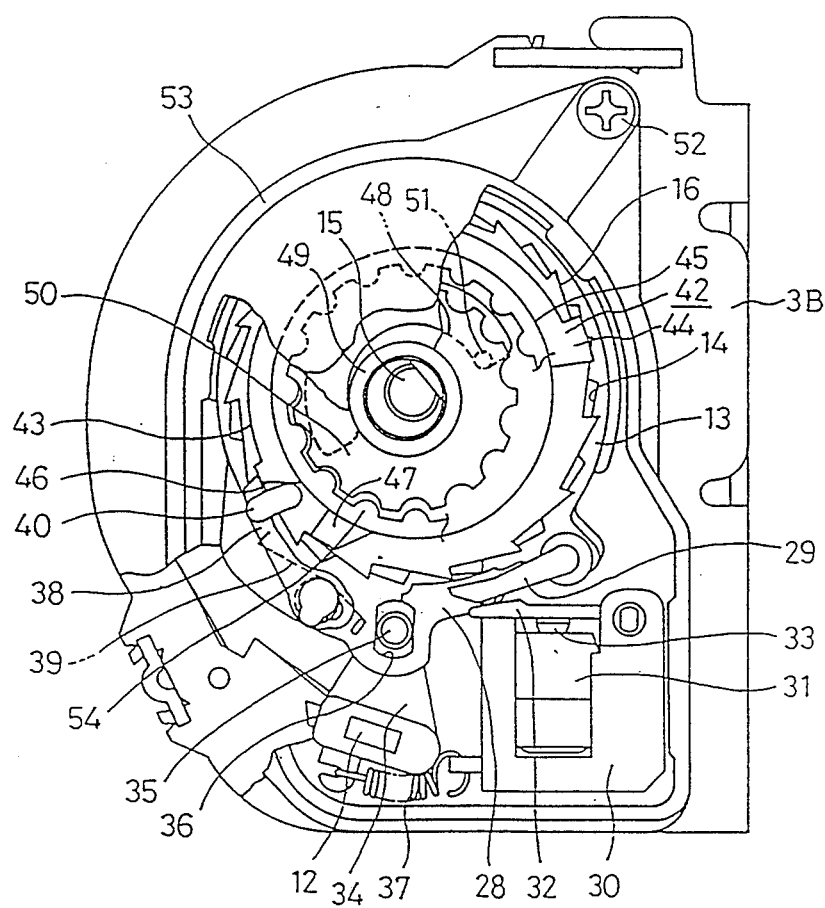
Figure 4:
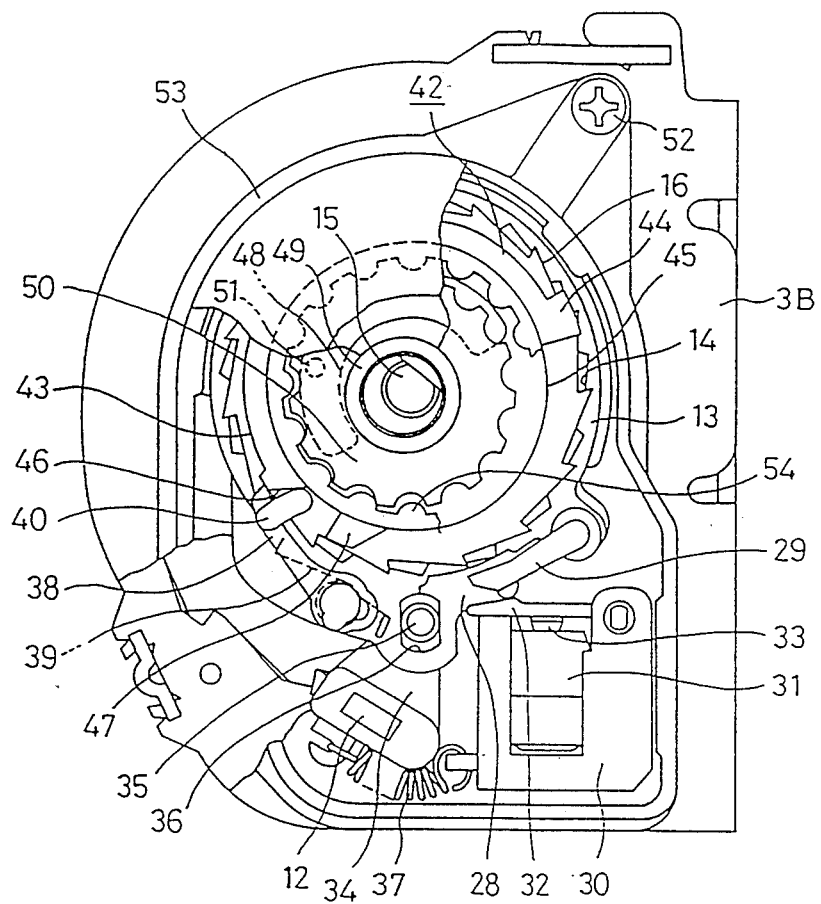

With continual unwinding of the webbing, the planetary gear 50 is rotated clockwise in FIG. 2 while its speed is being reduced. When the webbing is pulled out by nearly half of the total length thereof, the pusher pin 51 of the planetary gear 50 is fitted in the rear end portion when viewed, in the direction of unwinding of the webbing, of the arcuate groove 48 in the control cam 42. With the subsequent continual unwinding of the webbing, turning of the planetary gear 50 allows the pusher pin 51 to engage with the edge of the arcuate groove 48 in the control cam 42 thus urging or turning the control cam 42 clockwise. This turning of the control cam 42 allows gradual movement in the position of the first cam face 43, with which the cam follower 40 of the lever 38 is engaged, towards the second cam face 45. In the condition that the webbing has been pulled out in full length, the cam follower 40 is engaged with the second cam face 45 on the control cam 42 as shown in FIG. 3 so that the lever 38 assumes a position where it is engageable with the synchrogear 16 by the action of the wire spring 39 thereby changing the function of the retractor from the above-mentioned ELR to the ALR. That is to say, if the seat occupant releases his hand from the webbing which has been pulled out in full length, then the webbing will be rewound by the resilient force of the spiral spring 8. But, even if a pulling-out force is applied to the webbing in this condition, the lever 38 is engaged with the synchrogear 16 as shown in FIG. 4 so that the webbing cannot be pulled out. Further, even if the webbing is rewound in this state, the planetary gear 50 will turn at a reduced speed counterclockwise reverse to the direction of rotation of the spindle 6, however, while the webbing is being rewound from the fully drawn out condition to substantially half of the full length thereof, the pusher pin 51 projecting from the planetary gear 50 will move in the arcuate groove 48 in the control cam 42 so that the control cam 42 remains stationary and the cam follower 40 of the lever 38 continues to engage with the second cam face 45 on the control cam 42 to thereby allow the retractor to continue its function as an ALR.

Figure 5:
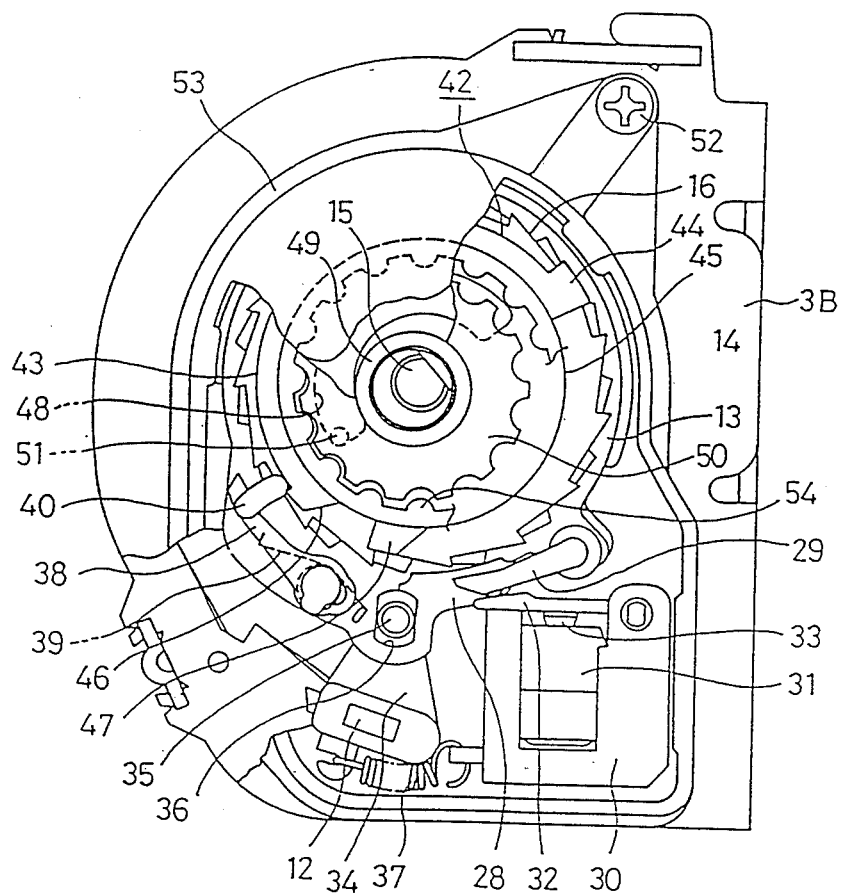

When the webbing has been rewound by about half of the full length thereof, the pusher pin 51 projecting from the planetary gear 50 is fitted in the leading end, when viewed in the direction of unwinding of the webbing, of the arcuate groove 48 of the control cam 42. With subsequent further rewinding of the webbing, the counterclockwise turning of the planetary gear 50 allows the pusher pin 51 to engage with the edge of the arcuate groove 48 thereby urging or turning the control cam 42 counterclockwise. This turning of the control cam 42 allows the cam follower 40 to ride gradually from the second cam face 45 onto the inclined face 46 and abut against the first cam face 43 again. As a result, as shown in FIG. 5, the lever 38 is disengaged from the synchrogear 16 thus changing the retractor from the ALR state to the ELR state. With the subsequent continual rewinding of the webbing, the control cam 42 is turned counterclockwise by the pusher pin 51 of the planetary gear 50 and tends to return to the state shown in FIG. 2, whereas, when the webbing is pulled out, the pusher pin 51 of the planetary gear 50 will move clockwise inside the arcuate groove 48 in the control cam 42 so that the retractor will continue to function as an ELR until the webbing is pulled out in full length.

As is obvious from the retractor shown in this embodiment, since the restraint of unwinding of the webbing is made by two means, i.e., the engagement of the clutch plate 13 of the locking arm 22 with one of the internal teeth 14 and the inclination of the weight 31, a high operational safety is achieved, and also when the webbing has been pulled out fully the retractor is changed from the ELR state to the ALR state. Therefore, in case a child seat is fixedly secured to a seat in a vehicle, it is only necessary to pull out the webbing fully thereby allowing the retractor to function as an ALR, and when the seat occupant wears the seat belt the retractor is kept in the ELR state so that an excellent effect can be obtained that the seat occupant can use the seat belt without feeling a strong tightness.

Figure 7:
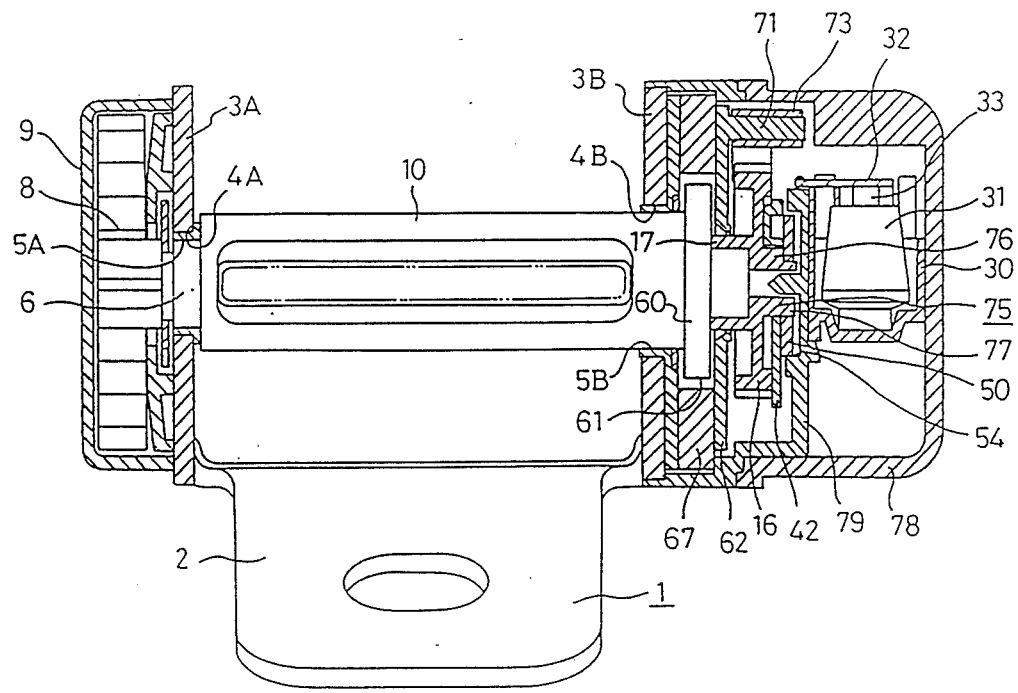

FIGS. 7 to 11 show a second embodiment of the retractor for seat belts according to the present invention. FIG. 7 is a front view showing the longitudinal section of the retractor. FIGS. 8, 9, 10 and 11 are right side elevational views, respectively, showing the operation of the retractor. This retractor has a simplified construction as compared with the retractor according to the aforementioned first embodiment. Briefly, this retractor according to the second embodiment is not provided with the clutch plate 13, the inertia mass 18 and the locking arm 22 etc., all of which serve to restrain the pulling-out of the webbing when the latter is quickly pulled out, but the weight 31 is located on the axis of the spindle 6 in order to reduce the overall diameter of the retractor.

This second embodiment will be described below. Further, the component parts identical to those mentioned above are indicated by the same reference characters in the drawings, and the description thereof is omitted.

In FIGS. 7 to 11, one end portion of the spindle 6 extends through the side plate 3B. Fitted on one end portion of this spindle 6 is a locking plate 60 having outer teeth 61 formed on the outer periphery thereof. This locking plate 60 is arranged to be rotated synchronously with the spindle 6. Further, a synchrogear 16 is fitted on the end portion of the spindle 6 projecting from the locking plate 60. This synchrogear 16 is also arranged to be rotated synchronously with the spindle 6. This synchrogear 16 has a boss 17 formed integrally therewith and which is located on the periphery of the end portion of the spindle 6. An annular clutch plate 62 is rotatably supported on this boss 17. This clutch plate 62 has a notch 63 formed in the outer periphery thereof. Interposed between a fixed spring seat 64 extending into the notch 63 and the end face of the notch 63 is a coiled spring 65 which is guided by an arcuate guide rod 66 extending from the clutch plate 62 into the notch 63. The clutch plate 62 is given a turning force by this coiled spring 65 in the direction of winding of the webbing.

The side plate 3B of the retractor body 1 is fitted with a locking ring 67 which is comprised of an annular plate and which is located adjacent to the clutch plate 62 and along the outer peripheral side of the locking plate 60 and at a predetermined clearance from the latter. This locking ring 67 has a plurality of circumferentially inclined cam faces 68 formed therein. The clutch plate 62 has radial guide holes 69 formed therein, the number of which corresponds to that of the cam faces 68. Inserted in each of the guide holes 69 is an axial part of a cylindrical locking roller 70 extending into the clearance between the locking plate 60 and the locking ring 67. Each of the locking rollers 70 is arranged such that it is normally located at a position spaced away from the outer periphery of the locking plate 60, and when the clutch plate 62 is turned in the direction of unwinding of the webbing (counterclockwise in FIG. 8), it is moved along the cam faces 68 of the locking ring 67 and towards the outer periphery of the locking plate 60 and is fitted finally in one of the external teeth 61 of the locking plate 60 thereby restraining the rotation of the spindle 6.

The clutch plate 62 has a pin 71 which projects therefrom and extends in parallel with the axis of the spindle 6. This pin 71 extends radially outwardly of the synchrogear 16 and the control cam 42 which will be mentioned later. The central portion of a generally angle-shaped hook 73 is pivotally mounted on the pin 71 in a manner such that it may be turned freely. This hook 73 has one arm 74A formed so as to be engageable with the synchrogear 16. Further, this hook 73 is constructed such that another arm 74B thereof is heavier than the arm 74A to enable the arm 74B to assume normally its lowered position.

The end portion of the spindle 6 has a rotor 75 fitted thereon and which is comprised of a concentric shaft portion 76 formed concentrically with the spindle 6 and an eccentric shaft portion 77 formed eccentrically with the spindle 6, both of the shaft portions 76, 77 being formed integrally. Fitted on the eccentric shaft portion 77 of this rotor 75 is a planetary gear 50 which is disposed eccentrically with the spindle 6. A cover 78 having a support plate 79 located on one side of the planetary gear 50 is fixedly secured to the outer periphery of the side plate 3B by means of screws 52, 52. This support plate 79 has an internal gear 54 formed therein and which meshes with the planetary gear 50. Further, the control cam 42 disposed between the synchrogear 16 and planetary gear 50 is loosely fitted on the coaxial shaft portion 76 of the rotor 75 so that it may be rotated freely relative to the concentric shaft portion 76. The control cam 42 has an arcuate groove 48 having a large width formed therein over an angular range of 180 degrees. The pusher pin 51 projecting from the planetary gear 50 is loosely fitted in this arcuate groove 48.

Whilst, a lever 38 engageable with the synchrogear 16 is pivotally mounted on the clutch plate 62 so that it may be turned freely. This lever 38 is given by a wire spring 39 interposed between the lever and the clutch plate 62 a clockwise turning tendency in FIG. 8 so as to engage with the synchrogear 16. Further, this lever 38 has a cam follower 40 which projects therefrom and extends from the synchrogear 16 towards the end of the spindle 6. Further, the control cam 42 has a first cam face 43 having a large diameter formed on the outer periphery thereof over an angular rang of about 70 degrees and which serves to disengage the lever 38 from the synchrogear 16 against the resilient force of the wire spring 39. This first cam face 43 has a stopper 44 formed to project therefrom at the circumferentially clockwise end thereof and which is adapted to prevent the cam follower 40 to disengage from the first cam face 43. Further, the first cam face 43 has a second cam face 45 formed at the circumferentially counterclockwise end thereof and through the inclined face 46 over a large angular range and which is smaller in diameter than the first cam face 43 and serves to engage the lever 38 with the synchrogear 16.

The cover 78 has a casing 30 mounted therein and in which a weight 31 is mounted. Further, a mechanical lever 32 whose central projection 33 is seated on the weight 31 is pivotally mounted on the upper part of the casing 30 so that it may be oscillated freely. The leading end of this mechanical lever 32 extends below the leading end of the arm 74B of the hook 73. And, this mechanical lever 32 is arranged such that it may turn clockwise as shown in FIG. 8 when the weight 31 is tilted so as to turn the arm 74A of the hook 73 and engage it with the synchrogear 16.

The operation of the retractor according to this embodiment will now be described below.

Figure 8:
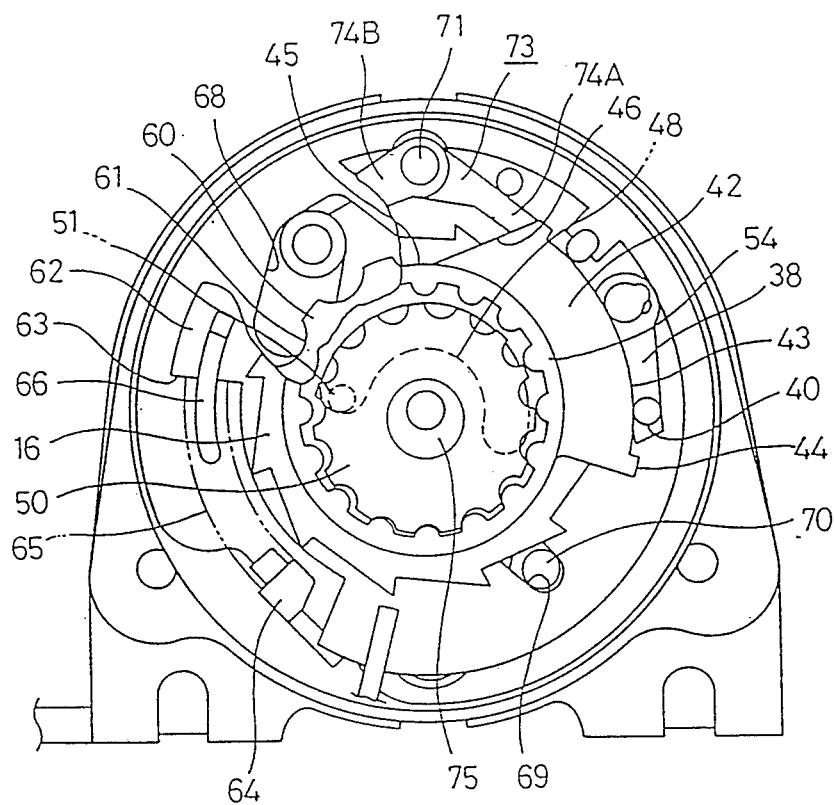

When the webbing has been wound in full length, the arm 74A of the hook 73 assumes a position where it is not engaged with the synchrogear 16 as shown in FIG. 8, and also the cam follower 40 formed integrally with the lever 38 is located at the end of the first cam 43 on the control cam 42, which is spaced away from the second cam face 45 so that the lever 38 is not allowed to engage with the synchrogear 16. Further, the pusher pin 51 projecting from the planetary gear 50 is fitted in the leading end, when viewed in the direction of unwinding of the webbing, of the arcuate groove 48 formed in the control cam 42.

When the webbing is pulled out in this condition to wind it around the seat occupant's body, the spindle 6 having the webbing wound thereon will rotate against the resilient force of the spiral spring 8 which accompanies rotation of the synchrogear 16 and the locking plate 60 in the counterclockwise direction as shown in FIG. 8. Further, at that time, the planetary gear 50 located eccentrically with the spindle 6 meshes with the internal gear 54 formed in the fixed cover 78, and so the planetary gear 50 is rotated clockwise at a reduced speed. However, since the pusher pin 51 projecting from this planetary gear 50 is moved clockwise in the arcuate groove 48 of the control cam 42, the control cam 42 remains stationary.

When the webbing is thus pulled out to wind it around the seat occupant, the retractor functions as an ELR.

When a braking force is applied suddenly to the vehicle while the seat occupant wears the seat belt, the weight 31 is tilted so as to turn the mechanical lever 32 as shown in FIG. 8 to thereby engage the arm 74A of the hook 73 with the synchrogear 16. Since this hook 73 is pivotally mounted on the clutch plate 62, the counterclockwise turning of the synchrogear 16 is transmitted through the hook 73 to the clutch plate 62 to turn this clutch plate 62 counterclockwise against the resilient force of the coiled spring 65. Whereupon, each of the locking rollers 70 is moved along the guide hole 69 of the clutch plate 62 towards the inner periphery of the latter to thereby restrain the rotation of the locking plate 60. As a result, the spindle 6 formed integrally with the locking plate 60 is prevented from rotating in the direction of unwinding of the webbing. Therefore, there is no fear of the seat belt wearer springing even when a braking force is applied suddenly to the vehicle. With the braking force applied suddenly to the vehicle being released afterwards, the inclined weight 31 is returned to its original upstanding condition and the clutch plate 62 is rotated clockwise by the action of the coiled spring 65 so that each of the locking rollers 70 is moved along each of the guide holes 69 towards the outer periphery of the clutch plate 62 to thereby enable the webbing to be pulled out again.

Figure 9:
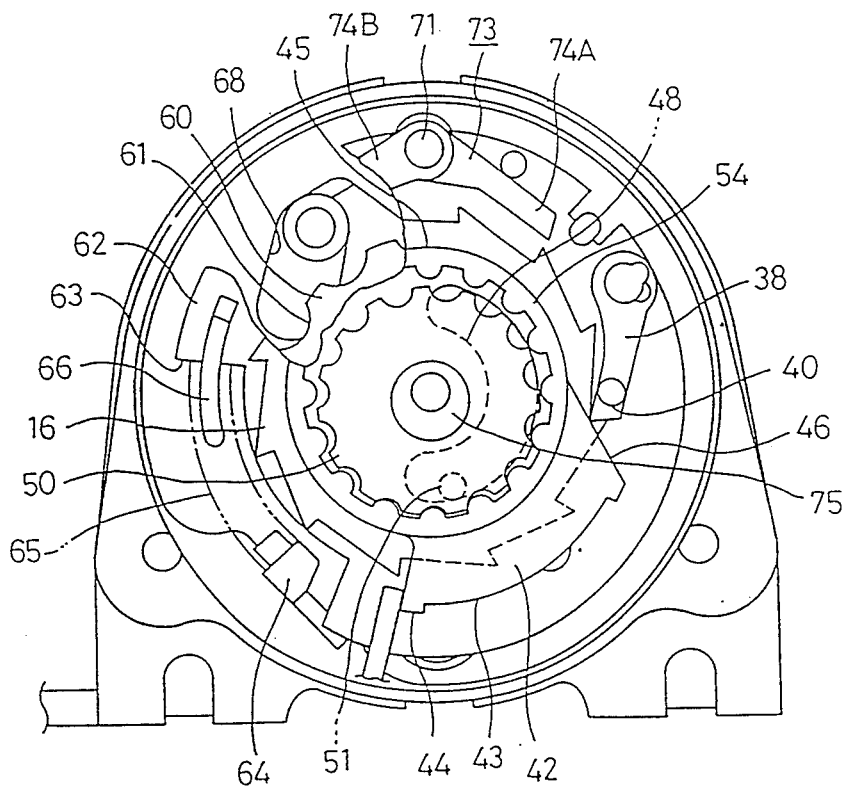
Figure 10:
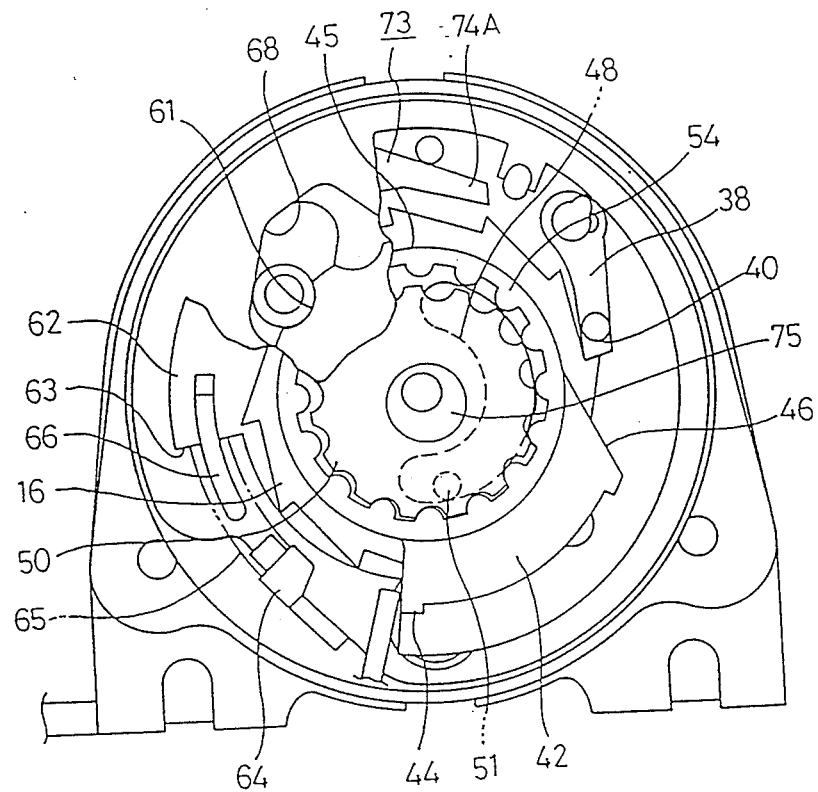

When the unwinding of the webbing is continued further, the planetary gear 50 is moved clockwise as shown in FIG. 8 while its speed is being reduced. When the webbing is pulled out nearly in full length, the pusher 51 projecting from the planetary gear 50 is fitted in the rear end, when viewed in the direction of unwinding of the webbing, of the arcuate groove 48 in the control cam 42. With further unwinding of the webbing, the planetary gear 50 is turned clockwise to allow the pusher pin 51 to engage with the edge of the arcuate groove 48 in the control cam 42 so as to urge or turn the control cam 42 in the clockwise direction. Whereupon, the turning of the control cam 42 will cause a gradual movement of the first cam face 43, with which the cam follower 40 of the lever 38 is engaged, towards the second cam face 45. In the condition that the webbing has been pulled out in full length, as shown in FIG. 9 the cam follower 40 is engaged with the second cam face 45 of the control cam 42 and the lever 38 assumes a position where it is engageable with the synchrogear 16 by the action of the wire spring 39 thereby changing the function of the retractor from the above-mentioned ELR state to the AL state. That is to say, when the seat belt wearer releases his hand from the webbing which has been fully pulled out, the webbing is rewound by the resilient force of the spiral spring 8. But, even if a force is applied to the webbing to pull it out in this condition, it cannot be pulled out since the lever 38 engages with the synchrogear 16 as shown in FIG. 10. Further, even if the webbing is rewound in this condition, the planetary gear 50 is rotated at a reduced speed counterclockwise reversely to the spindle 6, but while the webbing is rewound nearly in full length from its fully pulled out condition, the pusher pin 51 projecting from the planetary gear 50 in the arcuate groove 48 in the control cam 42. Consequently, the control cam 42 remains stationary and the cam follower 40 of the lever 38 is held in contact with the second cam face 45 on the control cam 42 so that the retractor continues to function as an ALR.

Figure 11:
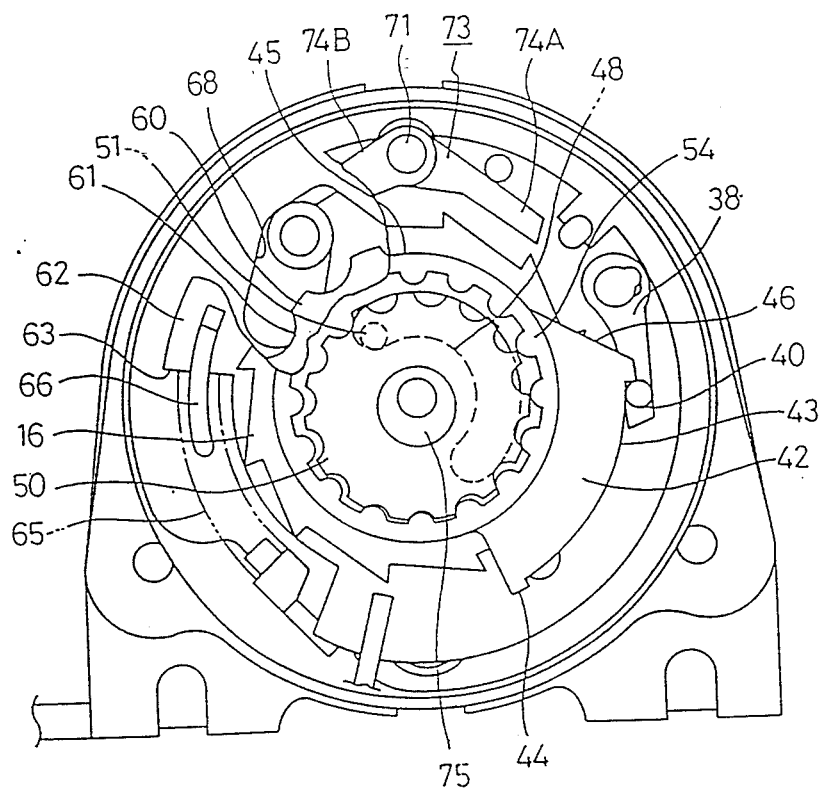

When the above-mentioned amount of rewinding of the webbing has reached its nearly full length, the pusher pin 51 of the planetary gear 50 is fitted in the leading end, when viewed in the direction of unwinding of the webbing, of the arcuate groove 48 of the control cam 42. When the webbing is rewound further, the counterclockwise turning of the planetary gear 50 allows the pusher pin 51 to engage with the edge of the arcuate groove 48 to urge or turn the control cam 42 in the counterclockwise direction. Whereupon, the turning of this control cam 42 allows the cam follower 42 to ride gradually from the second cam face 45 onto the inclined face 46 and contact with the first cam face 43 again. As a result, as shown in FIG. 11, the lever 38 is disengaged from the synchrogear 16 thereby changing the function of the retractor from the ALR state to the ELR state. When the webbing is rewound by some amount thereafter, the control cam 42 is turned counterclockwise by the pusher pin 51 of the planetary gear 50 so that the retractor may return to the condition shown in FIG. 8. While the webbing is pulled out, the pusher pin 51 of the planetary gear 50 is moved clockwise in the arcuate groove 48 in the control cam 42 so that the retractor may continue to function as an ELR until the webbing is pulled out in full length.

As is apparent from the above-mentioned embodiments, when the webbing is pulled out fully, the function of the retractor is changed from the ELR state over to the ALR state so that in case a child seat is fixed to a seat in a vehicle or the seat occupant wears the seat belt the ALR state and the ELR state can be selectively used as occasion demands to enable the seat belt wearer to be kept in a satisfactory wearing condition to meet respective purposes.

Further, in the above-mentioned first embodiment, there is described the retractor which comprises, in combination, what is called vehicle sensor adapted to restrain the unwinding of the webbing by the acceleration applied suddenly to the vehicle body, and the so-called strap sensor adapted to detect the quick unwinding of the webbing and restrain it. In the second embodiment, there is described the retractor having only the vehicle sensor. It is to be noted that those retractors having only the strap sensor are of course within the technical scope of the present invention.

As described hereinabove, the retractor for seat belts according to the present invention provides an excellent effect that the changeover of the function of the retractor from the ELR state to the ALR state is made only when the webbing has been pulled out in full length, and in a normal situation, the webbing is pulled out in response to the movement of the seat belt wearer to allow the retractor to function as an ELR so that the seat belt wearer does not feel a strong tightness and in case of emergency the retractor can securely restrain the seat belt wearer.

Thus according to the retractor of the present invention, an excellent effect is obtained wherein even when the unwinding of the webbing is locked in the ELR state the retractor is not allowed to change over to the ALR state, but can be returned again to the ELR state or unlocked condition.

What we claim is:

1. A retractor for seat belts, having a spindle supporting a webbing take-up shaft thereon, said spindle being rotatably supported on a retractor body in a direction of winding of the webbing, an inertia sensitive actuator means responsive to sudden vehicle acceleration and deceleration and a locking means including a clutch member rotatably mounted relative to said spindle and biased in a direction of winding the webbing, and a locking member connected to said clutch member, said clutch member being rotated synchronously with said spindle by the inertia means actuated in an emergency, said locking member being positioned to restrain the rotation of the spindle in the direction of unwinding the webbing characterized in that it comprises:

a synchrogear arranged to be rotated synchronously with said spindle;

a lever mounted on the clutch member of said locking means so as to turn freely and engageable with the synchrogear;

a spring member for biasing the lever in the direction of engagement of the lever with said synchrogear;

a control cam for engaging said lever with the synchrogear when the webbing is pulled out nearly in full length and for disengaging said lever from the synchrogear when the webbing is rewound by some degree; and transmission means for reducing the rotational speed of said spindle and transmitting the reduced rotational speed to the control cam, said transmission means including a planetary gear mechanism, the planetary gear mechanism being arranged to drive said control cam whereby the retractor functions as an emergency locking retractor until the webbing is pulled out to the full length of the webbing and is changed from an emergency locking retractor state to an automatic locking retractor state and is thereafter changed from the automatic locking retractor state to the emergency locking retractor state when the webbing is rewound by a predetermined amount thereafter.

2. The retractor for seat belts according to claim 1, wherein said inertia sensitive actuator means includes a first inertia pendulum, responsive to a sudden acceleration of the vehicle, which swings into contact with said locking member thereby restraining rotation of the spindle in the direction of unwinding the webbing and an inertia mass, responsive to a sudden pull on the webbing, operatively engageable with said synchrogear for restraining rotation thereof in the direction of unwinding the webbing, whereby a passenger is secured by both an emergency locking retractor and an automatic locking retractor upon sudden acceleration of a vehicle and upon the sudden pull of the webbing caused by a sudden deceleration of the vehicle, respectively.

* * * * *